(12) United States Patent
Stavropoulos

(10) Patent No.: US 12,425,689 B2
(45) Date of Patent: *Sep. 23, 2025

(54) MOBILE DEVICE ATTENTION DETECTION

(71) Applicant: The Nielsen Company (US), LLC, New York, NY (US)

(72) Inventor: John Stavropoulos, Edison, NJ (US)

(73) Assignee: The Nielsen Company (US), LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/654,950

(22) Filed: May 3, 2024

(65) Prior Publication Data

US 2024/0292058 A1   Aug. 29, 2024

Related U.S. Application Data

(63) Continuation of application No. 18/176,212, filed on Feb. 28, 2023, now Pat. No. 11,997,351, which is a continuation of application No. 16/910,316, filed on Jun. 24, 2020, now Pat. No. 11,632,587.

(51) Int. Cl.
| | |
|---|---|
| *H04N 21/442* | (2011.01) |
| *H04N 21/41* | (2011.01) |
| *H04N 21/4223* | (2011.01) |
| *H04W 88/02* | (2009.01) |

(52) U.S. Cl.
CPC ... *H04N 21/44218* (2013.01); *H04N 21/4126* (2013.01); *H04N 21/4223* (2013.01); *H04W 88/02* (2013.01)

(58) Field of Classification Search
None
See application file for complete search history.

(56) References Cited

U.S. PATENT DOCUMENTS

| | | | |
|---|---|---|---|
| 11,997,351 B2 * | 5/2024 | Stavropoulos ... | H04N 21/44218 |
| 2007/0011040 A1 * | 1/2007 | Wright ............. | H04H 60/52 |
| | | | 455/2.01 |
| 2008/0169930 A1 * | 7/2008 | Mallinson ......... | G06Q 30/02 |
| | | | 340/573.1 |
| 2008/0263579 A1 * | 10/2008 | Mears ............... | G11B 27/36 |
| 2009/0070797 A1 * | 3/2009 | Ramaswamy ..... | H04N 21/4524 |
| | | | 725/10 |
| 2013/0135198 A1 * | 5/2013 | Hodge .............. | H04N 21/4436 |
| | | | 345/156 |
| 2016/0073143 A1 * | 3/2016 | Filev ................ | H04L 67/52 |
| | | | 725/10 |
| 2016/0330517 A1 * | 11/2016 | Soundararajan ... | H04N 21/4524 |
| 2018/0295420 A1 * | 10/2018 | Rumreich .......... | H04N 21/4532 |
| 2019/0174186 A1 * | 6/2019 | Hao .................. | H04L 65/1016 |

\* cited by examiner

*Primary Examiner* — Alexander Q Huerta

(57) ABSTRACT

Methods, apparatus, systems and articles of manufacture are disclosed for mobile device attention detection. An example apparatus includes a mobile meter to receive, from an external device, a signal to gather user attention data, and transmit the user attention data. The example apparatus further includes an interval timer to activate a time period for determining attention of a user. The example apparatus further includes an attention determiner to generate the user attention data during the time period.

20 Claims, 9 Drawing Sheets

MOBILE DEVICE ATTENTION DETECTION

CROSS-REFERENCE TO RELATED APPLICATIONS

This disclosure is a continuation of U.S. patent application Ser. No. 18/176,212, now U.S. Pat. No. 11,997,351, filed on Feb. 28, 2023, which is a continuation of U.S. patent application Ser. No. 16/910,316, now U.S. Pat. No. 11,632,587, filed on Jun. 24, 2020, each of which is hereby incorporated by reference herein in its entirety. Priority to U.S. patent application Ser. Nos. 18/176,212 and 16/910,316 is hereby claimed.

FIELD OF THE DISCLOSURE

This disclosure relates generally to audience measurement and, more particularly, to mobile device attention detection.

BACKGROUND

Audience viewership data is collected and used by audience measurement entities (AMEs) to determine exposure statistics (e.g., viewership statistics) for different media. Some audience viewership data may be collected through device meters that detect media watermarks or media signatures associated with media presented via media presentation devices. Information from the device meters are processed by the AME to determine useful media exposure data and associated statistics.

BRIEF DESCRIPTION OF THE DRAWINGS

The figures are not to scale. In general, the same reference numbers will be used throughout the drawing(s) and accompanying written description to refer to the same or like parts.

Figure 1:
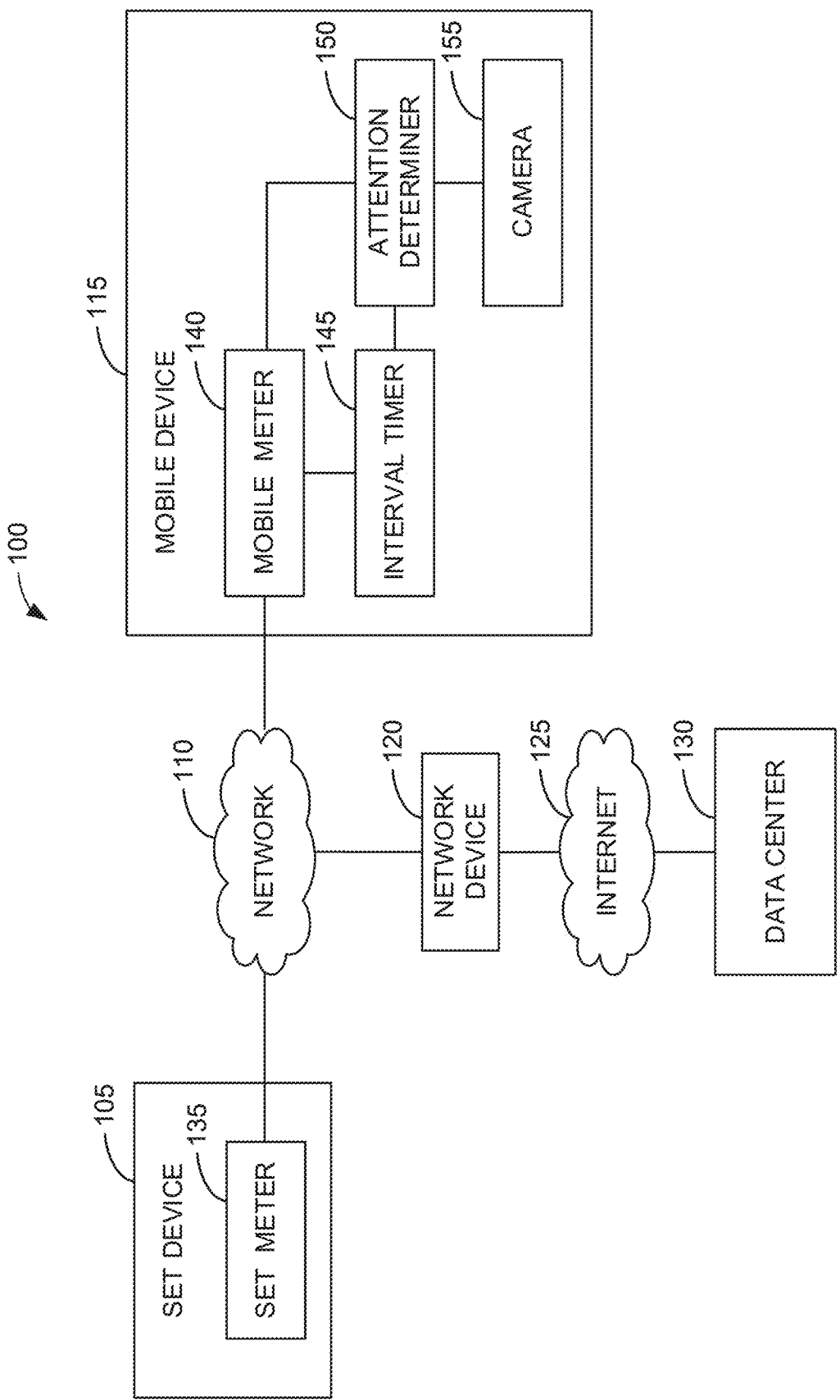
FIG. 1 illustrates an example environment in which mobile device attention is detected in accordance with the teachings of this disclosure.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

As used herein, the term "media" includes any type of content and/or advertisement delivered via any type of distribution medium. Thus, media includes television programming or advertisements, radio programming or advertisements, movies, web sites, streaming media, etc.

Example methods, apparatus, and articles of manufacture disclosed herein monitor media presentations at media devices. Such media devices may include, for example, Internet-enabled televisions, personal computers, Internet-enabled mobile handsets (e.g., a smartphone), tablet computers (e.g., an iPad®), digital media players (e.g., a Roku® media player, a Slingbox®, etc.), etc.

Example methods, apparatus, and articles of manufacture disclosed herein collect media monitoring information from various media devices. In some examples, media monitoring information is aggregated to determine ownership and/or usage statistics of media devices, determine the media presented, determine audience ratings, determine relative rankings of usage and/or ownership of media devices, determine types of uses of media devices (e.g., whether a device is used for browsing the Internet, streaming media from the Internet, etc.), and/or determine other types of media device information. In examples disclosed herein, monitoring information includes, but is not limited to, media identifying information (e.g., media-identifying metadata, codes, signatures, watermarks, and/or other information that may be used to identify presented media), application usage information (e.g., an identifier of an application, a time and/or duration of use of the application, a rating of the application, etc.), and/or user-identifying information (e.g., demographic information, a user identifier, a panelist identifier, a username, etc.).

In some examples, audio watermarking is used to identify media such as television broadcasts, radio broadcasts, advertisements (television and/or radio), downloaded media, streaming media, prepackaged media, etc. Existing audio watermarking techniques identify media by embedding one or more audio codes (e.g., one or more watermarks), such as media identifying information and/or an identifier that may be mapped to media identifying information, into an audio and/or video component. In some examples, the watermark is embedded in the audio or video component so that the watermark is hidden.

As used herein, the terms "code" or "watermark" are used interchangeably and are defined to mean any identification information (e.g., an identifier) that may be inserted or embedded in the audio or video of media (e.g., a program or advertisement) for the purpose of identifying the media or for another purpose such as tuning (e.g., a packet identifying header).

To identify watermarked media, the watermark(s) are extracted and used to access a table of reference watermarks that are mapped to media identifying information. In some examples, media monitoring companies provide watermarks and watermarking devices to media providers with which to encode their media source feeds. In some examples, if a media provider provides multiple media source feeds (e.g., ESPN and ESPN 2, etc.), a media provider can provide a different watermark for each media source feed. In some examples, a media provider could encode a media source feed with an incorrect watermark (e.g., a watermark meant for ESPN could accidentally be encoded on ESPN2, etc.). In this example, crediting using only watermarking could result in the wrong media source feed being credited.

In some examples, signature matching is utilized to identify media. Unlike media monitoring techniques based on codes and/or watermarks included with and/or embedded in the monitored media, fingerprint or signature-based media monitoring techniques generally use one or more inherent characteristics of the monitored media during a monitoring time interval to generate a substantially unique proxy for the media. Such a proxy is referred to as a signature or fingerprint, and can take any form (e.g., a series of digital values, a waveform, etc.) representative of any aspect(s) of the media signal(s) (e.g., the audio and/or video signals forming the media presentation being monitored). A signature may be a series of signatures collected in series over a time interval. A good signature is repeatable when processing the same media presentation, but is unique relative to other (e.g., different) presentations of other (e.g., different) media. Accordingly, the terms "fingerprint" and "signature" are used interchangeably herein and are defined herein to mean a proxy for identifying media that is generated from one or more inherent characteristics of the media.

Signature-based media monitoring generally involves determining (e.g., generating and/or collecting) signature(s) representative of a media signal (e.g., an audio signal and/or a video signal) output by a monitored media device and comparing the monitored signature(s) to one or more references signatures corresponding to known (e.g., reference) media source feeds. Various comparison criteria, such as a cross-correlation value, a Hamming distance, etc., can be evaluated to determine whether a monitored signature matches a particular reference signature. When a match between the monitored signature and a reference signature is found, the monitored media can be identified as corresponding to the particular reference media represented by the reference signature that matched with the monitored signature. In some examples, signature matching is based on sequences of signatures such that, when a match between a sequence of monitored signatures and a sequence of reference signatures is found, the monitored media can be identified as corresponding to the particular reference media represented by the sequence of reference signatures that matched the sequence of monitored signatures. Because attributes, such as an identifier of the media, a presentation time, a broadcast channel, etc., are collected for the reference signature(s), these attributes may then be associated with the monitored media whose monitored signature matched the reference signature(s).

In some examples, a user may interact with multiple media devices at a time. For example, a user may be watching media on a set device (e.g., on a television set) and interacting with media on a mobile device (e.g., on a smartphone). In such examples, it is difficult to determine which media (e.g., on the set device or on the mobile device) the user is paying attention to just from the media monitoring information. For example, the media monitoring information from the set device may indicate that the user was watching an advertisement presented via the set device during a period time, and the media monitoring information from the mobile device may indicate that the user was watching other media presented via the mobile device during the same period of time. However, in such examples, the media monitoring information does not indicate if the user is looking at the media on the set device or looking at the media on the mobile device during the period of time. Thus, the media monitoring information may provide inaccurate information related to media exposure.

Example methods, apparatus, and articles of manufacture disclosed herein determine whether the user's attention is on the mobile device during specific periods of time. In some examples, the set device signals to the mobile device to take an action during a time period (e.g., during an advertisement, a specific broadcasting event such as a political debate, etc.). Examples disclosed herein provide instructions from the set device to a mobile device that determines if the user's attention is on the mobile device. In some examples, a camera on the mobile device is turned on to detect the face of a user to determine the orientation of the face and/or the gaze of the user, which may indicate if the user's attention is on the mobile device. In some examples, the mobile device can detect other user interactions with the mobile device such as, for example, touch on a screen, external device connections (e.g., use of headphones, ear buds, etc.), application launches, orientation and/or positioning of the mobile device, etc. to determine if the user's attention is on the mobile device. Examples disclosed herein provide user attention data results with the media monitoring information for time periods of interest.

FIG. 1 illustrates an example environment in which mobile device attention is detected in accordance with the teachings of this disclosure. The example environment 100 of FIG. 1 includes an example set device 105, an example network 110, an example mobile device 115, an example network device 120, an example internet 125, and an example data center 130. The example set device 105 includes an example set meter 135. The example mobile device includes an example mobile meter 140, an example interval timer 145, an example attention determiner 150, and an example camera 155.

In the illustrated example of FIG. 1, the example set device 105 is used to access and view different media. The example set device 105 can be implemented with any device or combinations of devices that are able to connect to media such as, for example, a smart television (TV), a set-top box (STB), a game console, a digital video recorder (DVR), an Apple TV, a Roku device, YouTube TV, an Amazon fire device, other over-the-top (OTT) devices, etc., or any combination thereof. The example set device 105 is in proximity to the mobile device 115. For example, the set device 105 and the mobile device may be in the same room of a house or other building.

The example set meter 135 of the illustrated example of FIG. 1 collects media monitoring information from the example set device 105. In some examples, the set meter 135 is associated with (e.g., installed on, coupled to, etc.) the set device 105. For example, an associated set device 105 presents media (e.g., via a display, etc.) while, in other examples, the associated set device 105 presents the media on separate media presentation equipment (e.g., speakers, a display, etc.). In such examples, the set meter 135 may have a direct connection (e.g., physical connection) to the set device 105 to be monitored, and/or may be connected wirelessly (e.g., via Wi-Fi, via Bluetooth, etc.) to the set device 105 to be monitored. The example set meter 135 identifies events in the media and/or the media monitoring information that are of interest. For example, the example set meter 135 can identify that an advertisement commercial of interest is being presented or is scheduled to be presented on the example set device 105 based on the collected media monitoring information and/or a schedule of media to be presented. The example set meter 135 can use any content identification technology to identify media events of interest such as, for example, automatic content recognition (ACR), watermarks, signatures, etc.

The example set meter 135 transmits instructions to the example mobile meter 140 when the example set meter 135 identifies a media event of interest from the media and/or the media monitoring information. The example set meter 135 can transmit instructions to the example mobile meter 140 using any communication interface such as, for example, Wi-Fi, Bluetooth, cellular interfaces, etc. However, other means of transmitting instructions may additionally and/or alternatively be used. In some examples, the instructions can be a control start signal when the beginning of a media event of interest is first identified in the media and/or the media monitoring information, and a control end signal when the end of a media event of interest is identified in the media and/or the media monitoring information. In some examples, the set meter 135 can receive user attention data from the example mobile meter 140. In such examples, the set meter 135 may transmit the collected media monitoring information and the user attention data to/via the example internet 125. In the illustrated example of FIG. 1, the set meter 135 transmits instructions to one mobile meter on one mobile device (e.g., the mobile meter 140 and the mobile device 115), and the set meter 135 receives the user attention data from the one mobile meter 140 on the mobile device 115. However, in some examples, the set meter 135 may transmit the instructions to multiple mobile meters on one or more mobile devices on the same network and/or other networks in a household. In such examples, the set meter 135 may receive user attention data from the multiple mobile meters on the one or more mobile devices. In such examples, the set meter 135 may transmit the collected media monitoring information and the collective user attention data from the multiple mobile meters to/via the example internet 125.

The example network 110 of the illustrated example of FIG. 1 provides communication between the example set meter 135 and the example mobile meter 140. The example set meter 135 transmits instructions to the example mobile meter 140 using the example network 110. The example mobile meter 140 uses the example network 110 to transmit user attention data to the example set meter 135. In some examples, the set meter 135 transmits the collected media monitoring information and the example user attention data to the example internet 125 using the example network 110. The example network 110 is implemented as a local area network (LAN). However, any other type of network may additionally and/or alternatively be used such as, for example, a wide area network (WAN), a wireless local area network (WLAN), a storage area network (SAN), etc.

The example mobile device 115 of the illustrated example of FIG. 1 is used to access and view different media and information. The example mobile device 115 can be implemented with any device or combinations of devices that are able to connect to the example network 110 and receive the instructions from the example set meter 135 such as, for example, a smartphone, a laptop, a tablet, etc., or any combination thereof.

The example mobile meter 140 of the illustrated example of FIG. 1 receives the instructions from the example set meter 135. In some examples, the mobile meter 140 receives the control start signals and control end signals from the example set meter 135. In some examples, the mobile meter 140 transmits user attention data to the example set meter 135. In some examples, the mobile meter 140 associates the time stamp of when the user attention data was gathered and/or determined prior to and/or when the example mobile meter 140 transmits the user attention data to the set meter 135. In some examples, the mobile meter 140 is associated with (e.g., installed on, coupled to, etc.) the mobile device 115. For example, an associated mobile device 115 presents media (e.g., via a display, etc.) while, in other examples, the associated mobile device 115 presents the media on separate media presentation equipment (e.g., speaker(s), a display, etc.). In such examples, the mobile meter 140 may have a direct connection (e.g., physical connection) to the set device 105 to be monitored, and/or may be connected wirelessly (e.g., via Wi-Fi, via Bluetooth, etc.) to the mobile device 115 to be monitored.

The example interval timer 145 of the illustrated example of FIG. 1 starts a timer when the example mobile meter 140 receives instructions from the example set meter 135 and/or when the instructions indicate a beginning of a data collection time period. In some examples, the interval timer 145 starts the timer when the example mobile meter 140 receives a control start signal. In some examples, user attention data is collected periodically over the data collection time period of an event of interest (e.g., time period between a control start signal and a control end signal). In such examples, the example interval timer 145 sets a timer to a data collection interval for the desired periodic user attention data collection. For example, the data collection interval may be five seconds (e.g., user attention data collected once every five seconds), ten seconds (e.g., user attention data collected once every ten seconds), thirty seconds (e.g., user attention data collected once every thirty seconds), etc. The example interval timer 145 runs the timer over the data collection time period defined in the control start signal, where the interval timer 145 segments the data collection intervals throughout the data collection time period. In other examples, the user attention data is collected continuously or aperiodically over the data collection time period. In such examples, the data collection interval would be set to zero (e.g., the interval timer 145 does not increment, and the user attention data is collected continuously until the example mobile meter 140 receives the control end signal). In some examples, the example interval timer 145 may receive a data collection time period from the instructions of the control start signal, where user attention data is only determined once during each data collection time period. In such examples, the data collection interval is the same as the data collection time period. Also, the data collection time period can be ten seconds, thirty seconds, one minute, etc. Other time periods may be used. The data collection time period may be different for different events of interest. For example, a first advertisement break during a television broadcast may be two minutes in duration and a second advertisement break may be one minute in duration. In this example, the data collection time period for the first advertisement break may be two minutes in duration and the data collection time period for the second advertisement break may be one minute in duration.

In some examples, collecting the user attention data periodically increases the battery efficiency for the example mobile device 115. Collecting the user attention data periodically requires less processor power (e.g., the processor is used periodically for the data collection), which increases the battery efficiency of the example mobile device 115. In such examples, collecting the user attention data periodically also decreases the granularity of the user attention data depending on the sampling rate determined by the collection period. For example, user attention data collected once every five seconds means the example mobile meter 140 transmits only 20% of user attention data during a data collection time period. In other examples, collecting the user attention data continuously decreases the battery efficiency for the example mobile device 115. Collecting the user attention data continuously requires the processor to be run continuously for the data collection, which causes the processor to use power from the battery during the entire data collection time period. When the processor consumes power from the battery for continuous amounts of time, the overall battery efficiency of the example mobile device 115 decreases. In such examples, collecting the user attention data continuously increases the granularity of the user attention data. For example, user attention data collected continuously means the example mobile meter 140 transmits 100% of the user attention data during a data collection time period.

The example interval timer 145 activates the data collection interval and monitors the amount of time that has passed during each data collection interval. The example interval timer 145 waits until the timer has reached the end of the data collection interval. In some examples, the interval timer 145 restarts the timer when the mobile meter 140 does not receive instructions to stop determining user attention (e.g., a control end signal). For example, the data collection time period for an example advertisement may be one minute, and the data collection interval may be ten seconds (e.g., user attention data collected once every ten seconds). In this example, the interval timer 145 restarts after each data collection interval (e.g., after ten seconds of the data collection time period, after twenty seconds of the data collection time period, after thirty seconds of the data collection time period, after forty seconds of the data collection time period, and after fifty seconds of the data collection time period.

Figure 2:
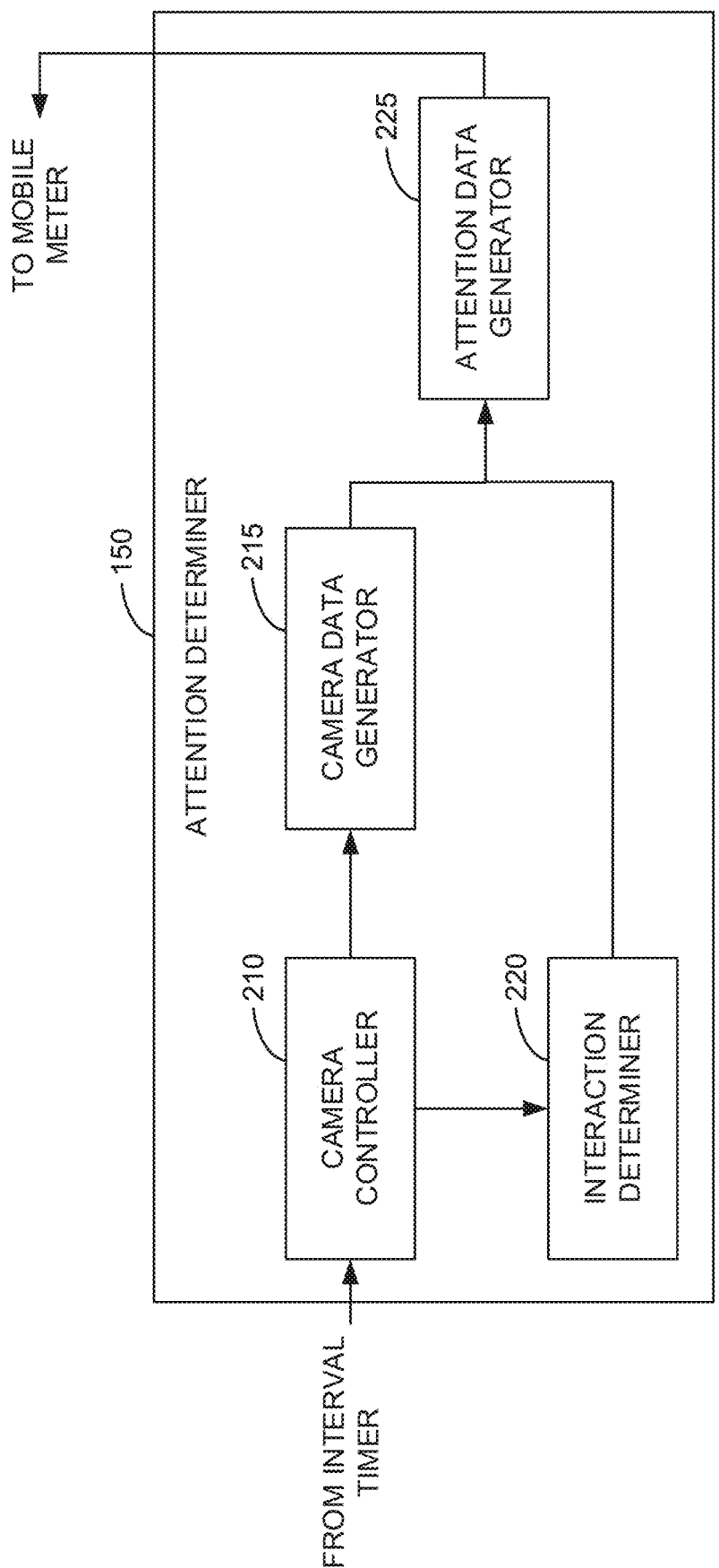
FIG. 2 is a block diagram representative of the example attention determiner of FIG. 1.

The example attention determiner 150 of the illustrated example of FIG. 1 determines user attention during each data collection interval. In some examples, the attention determiner 150 determines user attention using the example camera 155 of the example mobile device 115 to detect user gaze through face detection and face orientation detection. In some examples, the attention determiner 150 determines user attention using other forms of user interaction with the example mobile device 115. For example, the attention determiner 150 can determine user attention based on if an application has launched on the mobile device 115, if the user interacts with the screen of the example mobile device 115 (e.g., user touch on the screen), and/or if the any external devices are connected to the example mobile device 115 (e.g., headphones). In some examples, the attention determiner 150 can determine user attention based on an orientation of the mobile device 115 such as, for example, an angle of orientation of the mobile device 115. The example attention determiner 150 transmits the user attention data to the example mobile meter 140. An example implementation of the attention determiner 150 is illustrated in FIG. 2, which is described in further detail below.

The example network device 120 of the illustrated example of FIG. 1 provides communication between the example network 110 and the example internet 125. The example network device 120 provides the media monitoring information and the user attention data from the example network 110 to the example internet 125. The example network device 120 is implemented as a network device such as, for example, a modem. However, any other network devices may additionally and/or alternatively be used.

The example internet 125 of the illustrated example of FIG. 1 provides communication between the example network device 120, and the example data center 130. The example internet 125 provides communication of the media monitoring information and the user attention data from the example network device 120 and the example data center 130. The example internet 125 is implemented as a public network such as, for example, the Internet. However, any other type of networks (e.g., wireless, mobile cellular, etc.) which may be public or private, and any combination thereof may additionally and/or alternatively be used.

The example data center 130 of the illustrated example of FIG. 1 collects media monitoring information and user attention data from the example internet 125. In some examples, the data center 130 is associated with an AME. In some examples, the data center 130 can be a physical processing center (e.g., a central facility of the AME, etc.). Additionally or alternatively, the data center 130 can be implemented via a cloud service (e.g., Amazon Web Services (AWS), etc.). The example data center 130 can further store and process media monitoring information and user attention data. In some examples, the data center 130 associates the media monitoring information with the user attention data that was collected at the same time. In some examples, the user attention data may be collected by multiple mobile meters on different mobile devices. In such examples, the data center 130 can process the collective user attention data from the multiple mobile meters to determine trends on what media is more captivating to users in a household.

FIG. 2 is a block diagram representative of the example attention determiner 150 of FIG. 1. The example attention determiner 150 of FIG. 2 includes an example camera controller 210, an example camera data generator 215, an example interaction determiner 220, and an example attention data generator 225.

The example camera controller 210 of the illustrated example of FIG. 2 determines if the example mobile device 115 includes a camera 155. The example camera controller 210 activates the camera 155 of the example mobile device 115 when the example camera controller 210 determines that there is a camera available, upon receipt of a control start signal, and/or at the beginning of a data collection period and/or interval. In some examples, the example camera controller 210 activates the camera 155 of the example mobile device 115 in accordance with the data sampling or collection periodicity identified in the control start signal. For example, the camera controller 210 can activate the camera 155 once during the data collection interval, multiple times, continuously, etc. When there is no camera, the attention determiner 150 can determine user attention via other methods disclosed herein.

The example camera data generator 215 of the illustrated example of FIG. 2 determines if the attention of the user is on the example mobile device 115 using the camera 155 on the example mobile device 115. The example camera data generator 215 determines if the attention of a user is on the example mobile device 115 by determining if the user's head and/or face is detected by the camera 155. In some examples, the example camera data generator 215 detects the user's head and/or face by identifying general features of a face or head. For example, the example camera 155 may capture a user's eyes and nose. In this example, the camera data generator 215 detects that this capture is of a user's head and face because it includes the common features of a face (e.g., eyes and nose). However, other techniques of detecting a user's head and/or face may additionally and/or alternatively be used. In some examples, the camera data generator 215 determines the orientation of the user's head and/or face when the user's head and/or face is detected by the camera 155. The example camera data generator 215 determines if the attention of a user is directed to the example mobile device 115 when the camera data generator 215 determines that the user's face is pointed toward the example mobile device 115. In some examples, the camera data generator 215 can determine if the orientation of the user's face is toward the example mobile device 115 by determining if the eyes are visible and directed toward the camera 155. However, other techniques of determining user face orientation may additionally and/or alternatively be used. Additionally, the example camera data generator 215 determines if the attention of a user is on the example mobile device 115 by determining if the user's gaze is detected by the camera 155. In some examples, the camera data generator 215 determines the gaze of the user when the centers (e.g., pupils) of the user's eyes are detected by the camera 155. However, other techniques of determining user gaze may additionally and/or alternatively be used.

In some examples, the example interaction determiner 220 of the illustrated example of FIG. 2 determines user interactions with the example mobile device 115. In some examples, the interaction determiner 220 determines one or more user interactions with the mobile device 115 when the camera controller 210 determines that the mobile device 115 does not have a camera available. In some examples, the interaction determiner 220 determines user interactions with the mobile device 115 in addition to the user gaze data determined by the camera data generator 215. The example interaction determiner 220 determines if the attention of the user is on the example mobile device 115 by determining if any user interactions have occurred in the data collection interval. In some examples, the interaction determiner 220 determines a user interaction by determining if any applications were launched on the mobile device 115 (e.g., the user launches an email application on the mobile device 115, the user launches a social media application on the mobile device 115, etc.). In some examples, the interaction determiner 220 determines a user interaction by determining if any user interactions were detected on the screen of the mobile device 115 (e.g., user touch on the screen). In some examples, the interaction determiner 220 determines a user interaction by determining if any external devices were connected to the mobile device 115 (e.g. headphones). In some examples, the interaction determiner 220 determines a user interaction by determining the orientation of the mobile device 115 such as, for example, an angle of orientation of the mobile device 115.

The example attention data generator 225 of the illustrated example of FIG. 2 generates the user attention data based on the outputs of the example camera data generator 215 and/or the example interaction determiner 220. The example attention data generator 225 generates the user attention data to identify if the user's attention is on the example mobile device 115 during the data collection intervals. In some examples, the attention data generator 225 generates the user attention data based on a combination of the outputs of the example camera data generator 215 and the example interaction determiner 220. In some examples, the attention data generator 225 generates the user attention data based only on the output of the example camera data generator 215. In some examples, the attention data generator 225 generates the user attention data based only on the output of the example interaction determiner 220. For example, if the example mobile device 115 does not have the example camera 155, the example attention data generator 225 generates the user attention data based only on the output of the example interaction determiner 220. For example, the attention data generator 225 generates the user attention data based on the application launch data, the touch on the screen of the mobile device 115 data, the external device connection data, and/or the orientation of the mobile device 115. In some examples, the attention data generator 225 generates the user attention data based on only one of the above outputs of the example interaction determiner 220.

In some examples, the attention determiner 150 has a hierarchy of data used to determine attention data. For example, the attention determiner 150 first uses user gaze data to determine attention data. The second-most important or informative data may be application launch data; third-most important or informative data may be screen touch data; the fourth-most important or informative data may be external device connection data, and the fifth-most important or informative data may be data related to the orientation of the mobile device. In some examples, combinations of data may also be ranked in the hierarchy. In other examples, other hierarchical arrangements may be used to determine the importance and/or informative value of the data. In some examples, different weights may be applied to one or more of the data categories. In some examples, the hierarchy and/or weights may change depending on the media event of interest. For example, user gaze data may be weighted more heavily for a visual media event of interest and less heavily for an audio media event of interest.

In some examples, the attention data generator 225 generates binary user attention data. For example, the user attention data may contain a "1" that indicates the user's attention was on the example mobile device 115 and a "0" that indicates the user's attention was not on the example mobile device 115. In some examples, the attention data generator 225 generates user attention data with user activity descriptions. For example, the user attention data may contain descriptions of what the user was doing on the example mobile device 115 when the user's attention was determined to be on the example mobile device 115. For example, the user attention data may contain the description of "launched Facebook application" for the mobile device 115 during a data collection time period. The example attention data generator 225 provides the example mobile meter 140 of FIG. 1 with the example user attention data during the data collection time period(s).

While an example manner of implementing the example set device 105 is illustrated in FIG. 1, one or more of the elements, processes and/or devices illustrated in FIG. 1 may be combined, divided, re-arranged, omitted, eliminated and/or implemented in any other way. Further, the example set meter 135 and/or, more generally, the example set device 105 of FIG. 1 may be implemented by hardware, software, firmware and/or any combination of hardware, software and/or firmware. Thus, for example, any of the example set meter 135 and/or, more generally, the example set device 105 could be implemented by one or more analog or digital circuit(s), logic circuits, programmable processor(s), programmable controller(s), graphics processing unit(s) (GPU (s)), digital signal processor(s) (DSP(s)), application specific integrated circuit(s) (ASIC(s)), programmable logic device (s) (PLD(s)) and/or field programmable logic device(s) (FPLD(s)). When reading any of the apparatus or system claims of this patent to cover a purely software and/or firmware implementation, at least one of the example set meter 135 is/are hereby expressly defined to include a non-transitory computer readable storage device or storage disk such as a memory, a digital versatile disk (DVD), a compact disk (CD), a Blu-ray disk, etc. including the software and/or firmware. Further still, the example set device 105 of FIG. 1 may include one or more elements, processes and/or devices in addition to, or instead of, those illustrated in FIG. 1, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 3:
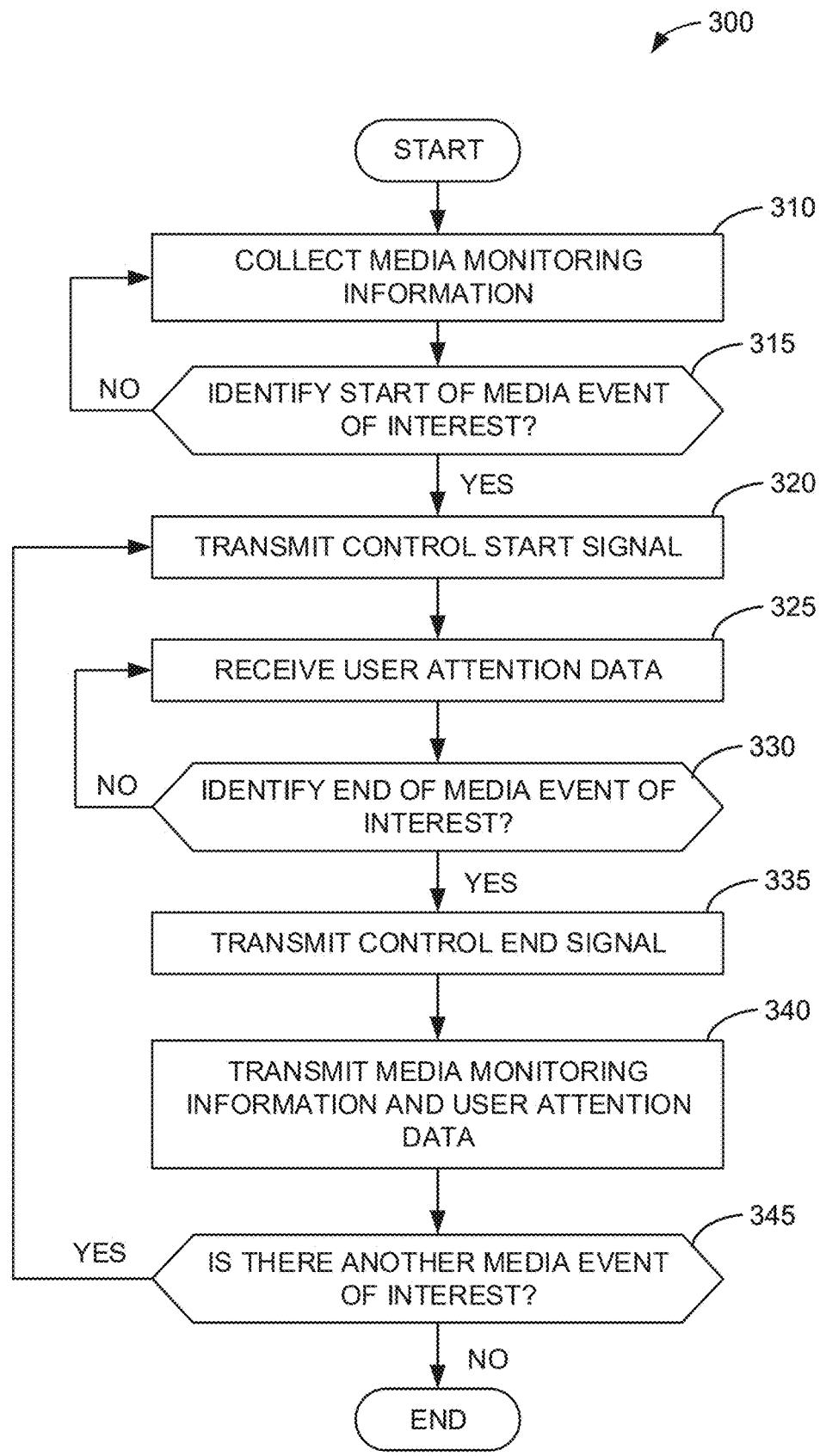
FIG. 3 is a flowchart representative of machine readable instructions which may be executed to implement an example set meter included in the set device of FIG. 1.

A flowchart representative of example hardware logic, machine readable instructions, hardware implemented state machines, and/or any combination thereof for implementing the example set device 105 of FIG. 1 is shown in FIG. 3. The machine readable instructions may be one or more executable programs or portion(s) of an executable program for execution by a computer processor such as the processor 812 shown in the example processor platform 800 discussed below in connection with FIG. 8. The program may be embodied in software stored on a non-transitory computer readable storage medium such as a CD-ROM, a floppy disk, a hard drive, a DVD, a Blu-ray disk, or a memory associated with the processor 812, but the entire program and/or parts thereof could alternatively be executed by a device other than the processor 912 and/or embodied in firmware or dedicated hardware. Further, although the example program is described with reference to the flowchart illustrated in FIG. 3, many other methods of implementing the example set device 105 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

While an example manner of implementing the example mobile device 115 of FIG. 1 is illustrated in FIGS. 1 and 2, one or more of the elements, processes and/or devices illustrated in FIGS. 1 and 2 may be combined, divided, re-arranged, omitted, eliminated and/or implemented in any other way. Further, the example mobile meter 140, the example interval timer 145, the example attention determiner 150, the example camera controller 210, the example camera data generator 215, the example interaction determiner 220, the example attention data generator 225 and/or, more generally, the example mobile device 115 of FIG. 1 may be implemented by hardware, software, firmware and/ or any combination of hardware, software and/or firmware. Thus, for example, any of the example mobile meter 140, the example interval timer 145, the example attention determiner 150, the example camera controller 210, the example camera data generator 215, the example interaction determiner 220, the example attention data generator 225 and/or, more generally, the example mobile device 115 could be implemented by one or more analog or digital circuit(s), logic circuits, programmable processor(s), programmable controller(s), GPU(s), DSP(s), ASIC(s), PLD(s) and/or FPLD(s). When reading any of the apparatus or system claims of this patent to cover a purely software and/or firmware implementation, at least one of the example mobile meter 140, the example interval timer 145, the example attention determiner 150, the example camera controller 210, the example camera data generator 215, the example interaction determiner 220, and/or the example attention data generator 225 is/are hereby expressly defined to include a non-transitory computer readable storage device or storage disk such as a memory, a DVD, a CD, a Blu-ray disk, etc. including the software and/or firmware. Further still, the example mobile device 115 of FIG. 1 may include one or more elements, processes and/or devices in addition to, or instead of, those illustrated in FIGS. 1 and 2, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

A flowchart representative of example hardware logic, machine readable instructions, hardware implemented state machines, and/or any combination thereof for implementing the example mobile device 115 of FIG. 1 is shown in FIGS. 4, 5, 6, and 7. The machine readable instructions may be one or more executable programs or portion(s) of an executable program for execution by a computer processor such as the processor 912 shown in the example processor platform 900 discussed below in connection with FIG. 9. The program may be embodied in software stored on a non-transitory computer readable storage medium such as a CD-ROM, a floppy disk, a hard drive, a DVD, a Blu-ray disk, or a memory associated with the processor 912, but the entire program and/or parts thereof could alternatively be executed by a device other than the processor 912 and/or embodied in firmware or dedicated hardware. Further, although the example program is described with reference to the flowchart illustrated in FIGS. 4, 5, 6, and 7, many other methods of implementing the example mobile device 115 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine readable instructions described herein may be stored in one or more of a compressed format, an encrypted format, a fragmented format, a compiled format, an executable format, a packaged format, etc. Machine readable instructions as described herein may be stored as data (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement a program such as that described herein.

In another example, the machine readable instructions may be stored in a state in which they may be read by a computer, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, the disclosed machine readable instructions and/or corresponding program(s) are intended to encompass such machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example processes of FIGS. 3, 4, 5, 6, and 7 may be implemented using executable instructions (e.g., computer and/or machine readable instructions) stored on a non-transitory computer and/or machine readable medium such as a hard disk drive, a flash memory, a read-only memory, a CD, a DVD, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

FIG. 3 is a flowchart illustrating an example process 300 that is representative of machine-readable instructions which may be executed to implement the example set meter 135 of FIG. 1. The program of FIG. 3 includes the example set meter 135 collecting the media monitoring information (block 310). In some example, the set meter 135 collects the media monitoring information from the set device 105. The example set meter 135 identifies the start of a media event of interest (block 315). In some examples, the set meter 135 identifies the start of a media event of interest using content identification technology such as, for example, ACR, watermarking, signatures, etc. For example, the set meter 135 may obtain and decode a watermark embedded in a stream of media. The watermark provides information related to the media and may be used by the set meter 135 to identify that the media associated with the watermark is an advertisement, which may be a media event of interest.

If the example set meter 135 identifies the start of a media event of interest, the process 300 continues and the set meter 135 transmits a control start signal (block 320). If the example set meter 135 does not identify the start of a media event of interest, the process 300 returns and the example set meter 135 collects the media monitoring information (block 310).

To transmit a control start signal (block 320), the set meter 135, in some examples, transmits the control start signal to the mobile meter 140 using the network 110. The set meter 135 transmits the control start signal using any communication interfaces such as, for example, Wi-Fi, Bluetooth, cellular interfaces, etc.

The example set meter 135 receives user attention data from the example mobile meter 140 (block 325). In some examples, the set meter 135 receives the user attention data from the example mobile meter 140 using the example network 110. In some examples, the set meter 135 associates the user attention data with the media monitoring information that was generated and/or collected at the same time.

The example set meter 135 identifies the end of the media event of interest (block 330). In some examples, the set meter 135 identifies the end of a media event of interest using any content identification technology such as, for example, ACR, watermarking, signatures, etc. For example, the set meter 135 may obtain and decode a watermark embedded in a stream of media. The watermark provides information related to the media and may be used by the set meter 135 to identify that the media associated with the watermark is not an advertisement, which may be the media event of interest. If the example set meter 135 identifies the end of the media event of interest, the process 300 continues and the set meter 135 transmits a control end signal (block 335). If the example set meter 135 does not identify the end of the media event of interest, the process 300 returns and the set meter 135 receives (e.g., continues to receive) the user attention data from the example mobile meter 140 (block 325). In some examples, the set meter 135 may not receive the user attention data from the example mobile meter 140 during the media event of interest. For example, the mobile meter 140 may not transmit the user attention data until after the set meter 135 identifies the end of the media event of interest. In this example, the mobile meter 140 may not transmit the user attention data until waiting a period of time after the set meter 135 identifies the end of the media event of interest.

To transmit the control end signal (block 335), the set meter 135, in some examples, transmits the control end signal to the mobile meter 140 using the network 110. The set meter 135 transmits the control end signal using any communication interfaces such as, for example, Wi-Fi, Bluetooth, cellular interfaces, etc. The example set meter 135 transmits the media monitoring information and the user attention data (block 340). The example set meter 135 transmits the collected media monitoring information and the user attention data for the event of interest to the example data center 130. In some examples, the set meter 135 transmits the media monitoring information and the user attention data to the data center 130 used the network 110, network device 120, and the internet 125.

In some examples, the example process 300 include the set meter 135 determining if there is another media event of interest (block 345). If there is another media event of interest, the process 300 continues and the set meter 135 transmits the control start signal (block 320). If there is no additional media event of interest, the process 300 ends.

Figure 4:
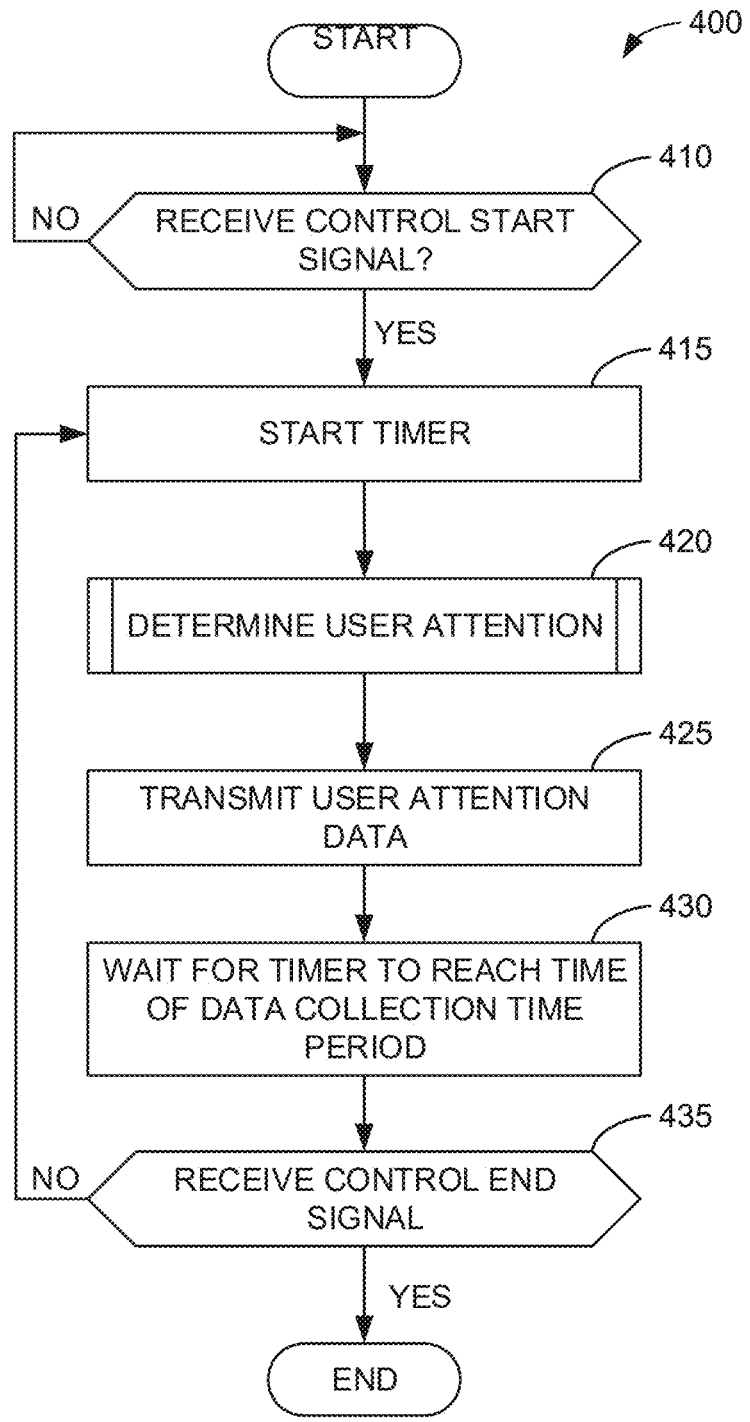
FIG. 4 is a flowchart representative of machine readable instructions which may be executed to implement the example mobile device of FIG. 1.

FIG. 4 is a flowchart illustrating an example process 400 that is representative of machine readable instructions which may be executed to implement the example mobile device 115 of FIG. 1. The program of FIG. 4 includes the example mobile meter 140 receiving the control start signal from the example set meter 135 (block 410). In some examples, the mobile meter 140 receives the control start signal from the example set meter 135 using the network 110. If the example mobile meter 140 receives the control start signal from the example set meter 135, the interval timer 145 starts timer (block 415). If the example mobile meter 140 does not receive the control signal from the example set meter 135, the process 400 sits idle until a control start signal is received (block 410).

In some examples, the example interval timer 145 starts the timer (block 415) in accordance with a data collection interval for the data collection time period identified in the control start signal. The data collection time period can be ten seconds, thirty seconds, one minute, etc. The example interval timer 145 activates a timer that keeps track of the data collection interval. In some examples, the user attention data is collected periodically during each data collection time period. In such examples, the example interval timer 145 sets a timer to a data collection interval for the desired periodic user attention data collection. For example, the data collection interval may be five seconds (e.g., user attention data collected once every five seconds), ten seconds (e.g., user attention data collected once every ten seconds), thirty seconds (e.g., user attention data collected once every thirty seconds), etc. The example interval timer 145 runs the timer over the data collection time period defined in the control start signal, where the interval timer 145 segments the data collection intervals throughout the data collection time period. In some example, the user attention data is collected continuously during each data collection time period. In such examples, the data collection interval would be set to zero (e.g., the interval timer 145 does not increment, and the user attention data is collected continuously until the example mobile meter 140 receives the control end signal). In some examples, the user attention data is collected once during each data collection time period. In such examples, the data collection interval is the same as the data collection time period.

The example attention determiner 150 determines user attention (block 420). In some examples, the attention determiner 150 can determine user attention using the camera 155 of the example mobile device 115 to detect user gaze through face detection and face orientation detection. In some examples, the attention determiner 150 can determine user attention using other forms of user interaction with the example mobile device 115. For example, the attention determiner 150 can determine user attention based on if an application has launched on the mobile device 115, if the user interacts with the screen of the example mobile device 115 (e.g., user touch on the screen), and/or if the any external devices are connected to the example mobile device 115 (e.g., headphones). As described in further detail below, the example flowchart 420 of FIG. 5 represents example instructions that may be implemented to determine the user attention.

The example mobile meter 140 transmits the user attention data from the example attention determiner 150 (block 425). In some examples, the mobile meter 140 transmits user attention data to the example set meter 135. In some examples, the mobile meter 140 associates the time stamp that the user attention data was determined when the example mobile meter 140 transmits the user attention data to the set meter 135. The example interval timer 145 waits for the timer to reach the time of the data collection interval (block 430). The example interval timer 145 monitors the amount of time that has passed on the timer until the timer reaches the amount of time for the data collection interval. In some examples, the mobile meter 140 may not transmit the user attention data during the data collection time period. For example, the mobile meter 140 may not transmit the user attention data until after the mobile meter 140 receives a control end signal. In this example, the mobile meter 140 may not transmit the user attention data until waiting a period of time after the mobile meter 140 receives a control end signal.

The example mobile meter 140 receives a control end signal from the example set meter 135 (block 435). In some examples, the mobile meter 140 receives the control end signal from the example set meter 135 using the network 110. If the example mobile meter 140 does not receive the control end signal from the example set meter 135, the example interval timer 145 restarts the timer (block 415). In some examples, the interval timer 145 restarts the timer when the mobile meter 140 does not receive a control end signal. For example, the data collection time period for an example advertisement of interest may be one minute, and the data collection interval may be ten seconds (e.g., user attention data collected once every ten seconds). In this example, the interval timer 145 restarts the timer after each data collection interval (e.g., after ten seconds of the data collection time period, after twenty seconds of the data collection time period, after thirty seconds of the data collection time period, after forty seconds of the data collection time period, and after fifty seconds of the data collection time period. If the example mobile meter 140 receives the control end signal from the example set meter 135, the process 400 ends.

Figure 5:
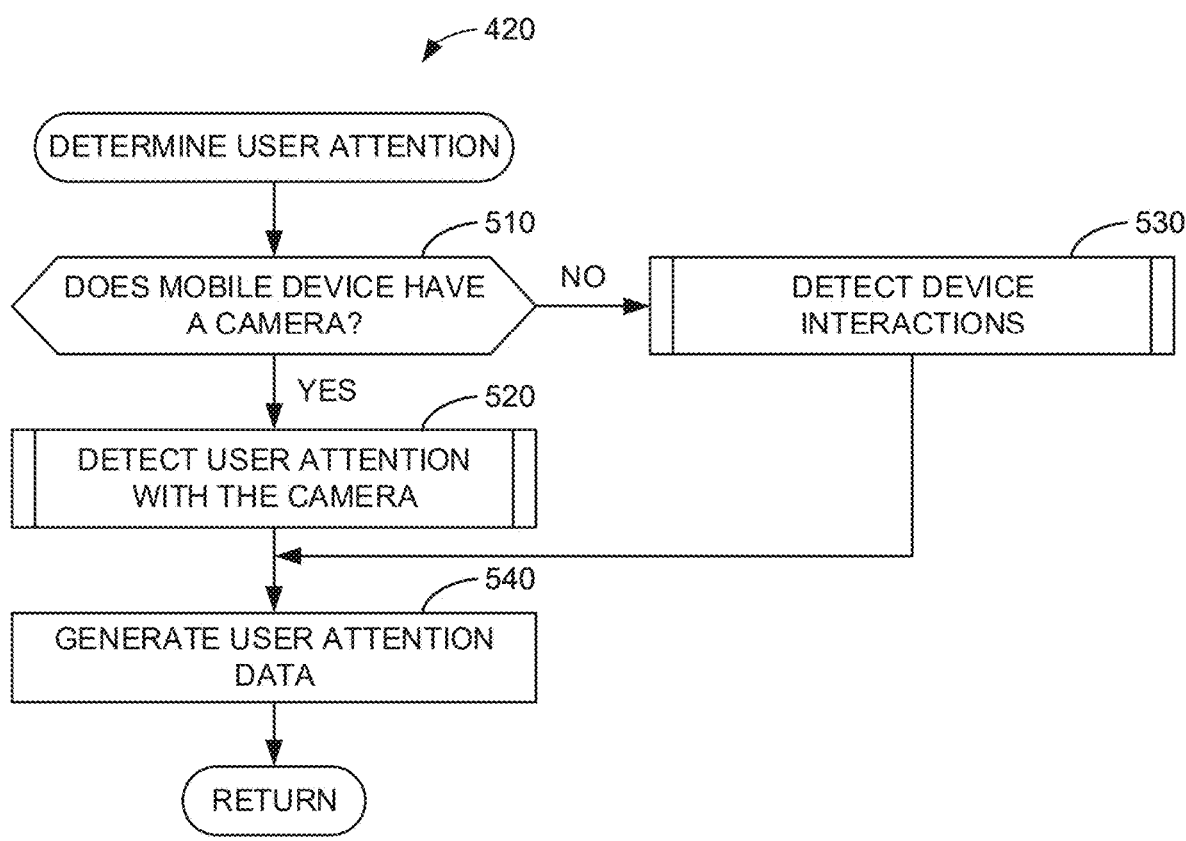
FIG. 5 is a flowchart representative of machine readable instructions which may be executed to implement an example attention determiner included in the mobile device of FIG. 1.

FIG. 5 is a flowchart illustrating a process 420 that is representative of machine readable instructions which may be executed to implement an example attention determiner 150 included in the example mobile device 115 of FIG. 1. The program of FIG. 5 begins execution at which the example camera controller 210 determines if the example mobile device 115 has a camera 155 (block 510). In some examples, the camera controller 210 determines if the mobile device 115 has a camera 155 after the interval timer 145 of FIG. 1 indicates the start of a new data collection interval. If the example camera controller 210 determines that the example mobile device 115 does have a camera 155, the process 420 continues and the camera data generator 215 detects the user attention with the camera 155 (block 520). If the example camera controller 210 determines that the example mobile device 115 does not have a camera, the process 420 continues and the interaction determiner 220 detects the device interactions (block 530). In some examples, as disclosed herein, the process 530 is performed when the mobile device does have a camera.

Figure 6:
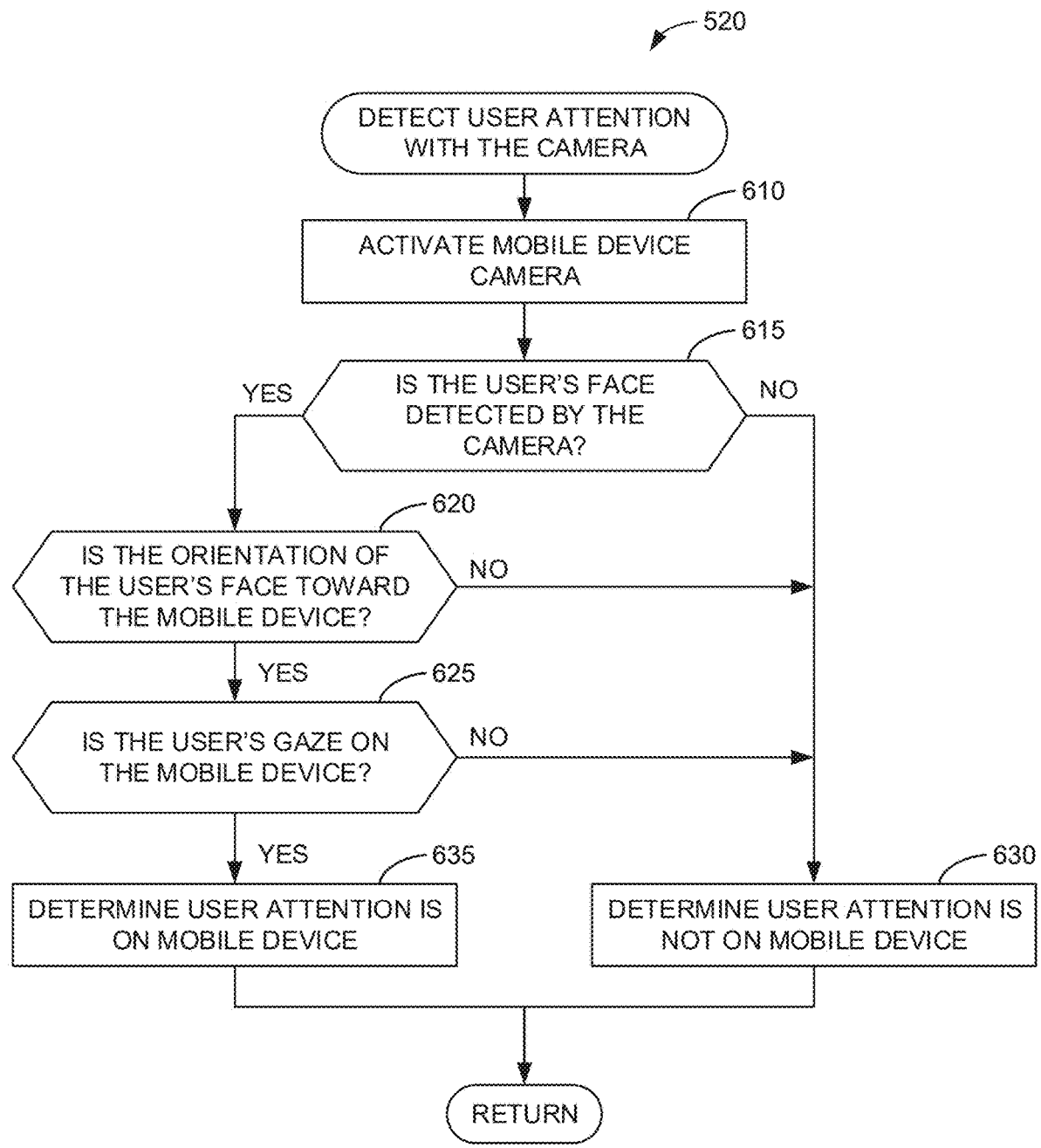
FIG. 6 is a flowchart representative of machine readable instructions which may be executed to implement an example camera controller and camera data generator included in the attention determiner of FIG. 2.

The example camera data generator 215 detects the user attention with the camera 155 (block 520). The example camera data generator 215 determines user attention using the camera 155. As disclosed in further detail below, the example flowchart 520 of FIG. 6 represents example instructions that may be implemented to detect user attention with the camera 155. After block 520, the process 420 continues and the attention data generator 225 generates the user attention data (block 540).

Figure 7:
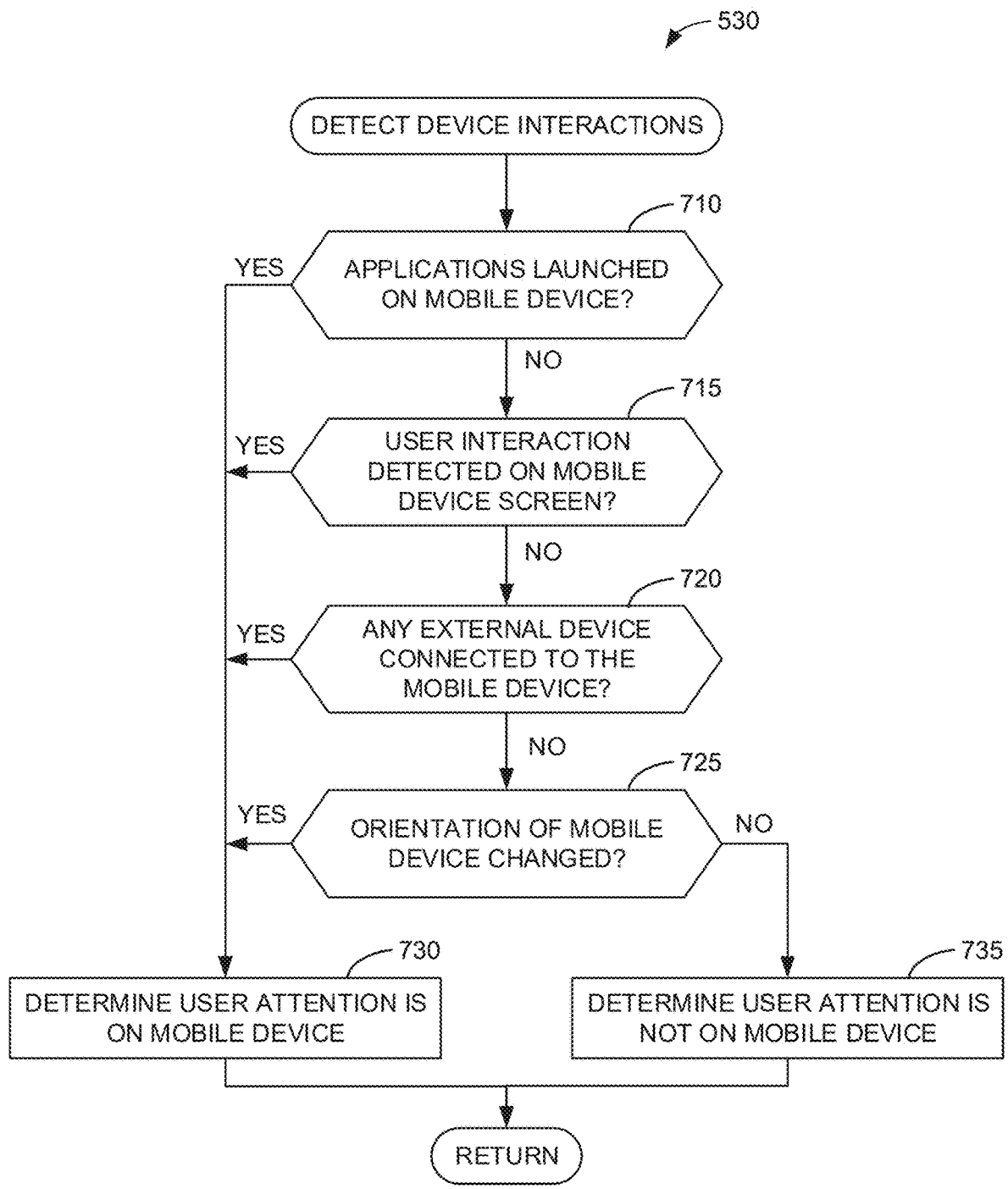
FIG. 7 is a flowchart representative of machine readable instructions which may be executed to implement an example interaction determiner included in the attention determiner of FIG. 2.

The example interaction determiner 220 detects the device interactions (block 530). In some examples, the interaction determiner 220 determines user interactions with the mobile device 115 when the camera controller 210 determines that the mobile device 115 does not have a camera available. In some examples, the interaction determiner 220 determines any user interactions with the mobile device 115 in addition to the user attention data determined by the camera data generator 215. As described in further detail below, the example flowchart 530 of FIG. 7 represents example instructions that may be implemented to detect device interactions. After block 530, the process 420 continues and the attention data generator 225 generates the user attention data (block 540).

The example attention data generator 225 generates the user attention data (block 540). The example attention data generator 225 generates the user attention data based on the outputs of the example camera data generator 215 and the example interaction determiner 220. The example attention data generator 225 generates the user attention data to identify if the user's attention is on the example mobile device 115 during each data collection interval determined by the example interval timer 145 of FIG. 1. In some examples, the attention data generator 225 generates binary user attention data. For example, the user attention data may contain a one that indicates the user's attention was on the example mobile device 115 and a zero that indicates the user's attention was not on the example mobile device 115. In some examples, the attention data generator 225 generates user attention data with user activity descriptions. For example, the user attention data may contain descriptions of what the user was doing on the example mobile device 115 when the user's attention was determined to be on the example mobile device 115. After block 540, the process 420 completes and returns to process 400 of FIG. 4.

FIG. 6 is a flowchart illustrating a process 520 that is representative of machine readable instructions which may be executed to implement an example camera controller 210 and an example camera data generator 215 included in the example attention determiner 150 of FIG. 2. The program of FIG. 6 includes the example camera controller 210 activating the example mobile device 115 camera 155 (block 610).

The example camera data generator 215 determines if the user's face is detected by the camera 155 (block 615). The example camera data generator 215 can use any face detection technology to determine if the user's face is detected by the camera 155 on the example mobile device 115. In some examples, the example camera data generator 215 detects the user's head and/or face by identifying general features of a face or head. For example, the example camera 155 may capture or detect a user's eyes and nose. In this example, the camera data generator 215 detects that this capture is of a user's head and face because the image or object in the field of view of the camera includes the commons features of a face (e.g., eyes and nose). However, other techniques of detecting a user's head and/or face may additionally and/or alternatively be used. If the example camera data generator 215 does determine that the user's face is detected by the camera 155, the process 520 continues and the camera data generator determines the orientation of user's face (block 620). If the example camera data generator 215 does not determine that the user's face is detected by the camera 155, the process 520 continues and the camera data generator 215 determines the user attention is not on the example mobile device 115 (block 630).

The example camera data generator 215 determines if the orientation of the user's face is toward the example mobile device 115 (block 620). In some examples, the camera data generator 215 can determine if the orientation of the user's face is toward the example mobile device 115 by determining if the eyes are visible and directed toward the camera 155. However, other techniques of determine user face orientation may additionally and/or alternatively be used. If the example camera data generator 215 determines that the orientation of the user's face is toward the example mobile device 115, the process 520 continues and the camera data generator 215 determines if the user's gaze is on the example mobile device 115 (block 625). If the example camera data generator 215 determines that the orientation of the user's face is not towards the example mobile device 115, the process 520 continues and the camera data generator 215 determines the user attention is not on the example mobile device 115 (block 630).

The example camera data generator 215 determines if the user's gaze is on the mobile device 115 (block 625). In some examples, the camera data generator 215 determines the gaze of the user when the center(s) (e.g., pupil(s)) of the user's eye(s) are detected by the camera 155. However, other techniques of determining user gaze may additionally and/or alternatively be used. If the example camera data generator 215 determines that the user's gaze is on the example mobile device 115, the process 520 continues and the camera data generator 215 determines the user attention is on the example mobile device 115 (block 635). If the example camera data generator 215 determines that the user's gaze is not on the example mobile device 115, the process 520 continues and the camera data generator 215 determines the user attention is not on the example mobile device 115 (block 630).

The example camera data generator 215 determines that the user attention is not on the example mobile device 115 (block 630). The example camera data generator determines that the user attention is not on the example mobile device 115 based on when the user's face is not detected by the camera 155 on the example mobile device 115 and/or the orientation of the user's face is not towards the camera 155 on the example mobile device 115. After block 630, the process 520 completes and returns to process 420 of FIG. 5.

The example camera data generator 215 determines that the user attention is on the example mobile device 115 (block 635). The example camera data generator determines that the user attention is on the example mobile device 115 based on when the user's face is detected by the camera 155 on the example mobile device 115 and the orientation of the user's face is towards the camera 155 on the example mobile device 115. After block 635, the process 520 completes and returns to process 420 of FIG. 5.

FIG. 7 is a flowchart illustrating a process 530 that is representative of machine readable instructions which may be executed to implement an example interaction determiner 220 included in the example attention determiner 150 of FIG. 2. The program of FIG. 7 includes the example interaction determiner 220 determining if any applications are launched on the example mobile device 115 (block 710). In some examples, the interaction determiner 220 determines if an application is launched using the processor of the mobile device 115. In such examples, the processor of the mobile device 115 is responsible for launching applications on the mobile device 115. In such examples, the interaction determiner 220 monitors the processor of the mobile device 115 for instructions to execute a new application. However, other techniques for determining if an application is launched on the mobile device 115 may additionally and/or alternatively be used. If the example interaction determiner 220 determines that an application was launched on the example mobile device 115, the process 530 continues and the interaction determiner 220 determines the user attention is on the mobile device 115 (block 730). If the example interaction determiner 220 determines that no applications were launched on the example mobile device 115, the process 530 continues and the interaction determine 220 determines if a user interaction is detected on the example mobile device 115 screen (block 715).

The example interaction determiner 220 determines if a user interaction is detected on the example mobile device 115 screen (block 715). In some examples, a user interaction can be one or more touches on the screen of the example mobile device 115. In some examples, the interaction determiner 220 determines if a user interaction is detected on the screen of the mobile device 115 by monitoring changes on the screen. For example, if the screen of the mobile device 115 is a capacitive touch screen, the interaction determiner 220 monitors the screen of the mobile device 115 for a change in the electrical charge of the capacitive material of the screen caused by the contact of a user's finger. In some examples, the screen of the mobile device 115 is a resistive touch screen, and the interaction determiner 220 may monitor the screen of the mobile device 115 for a change in the electrical resistance caused by the pressure of a user's touch. However, other type of screen and techniques for determining a user interaction with the screen of the mobile device 115 may additionally and/or alternatively be used. If the example interaction determiner 220 determines that a user interaction is detected on the example mobile device 115 screen, the process 530 continues and the interaction determiner 220 determines the user attention is on the mobile device 115 (block 730). If the example interaction determiner 220 determines that no user interaction is detected on the example mobile device 115 screen, the process 530 continues and the interaction determiner 220 determines if an external device is connected to the example mobile device 115 (block 720).

The example interaction determiner 220 determines if an external device is connected to the example mobile device 115 (block 720). In some examples, an external device can be headphones, speakers, and/or other auxiliary devices. In some examples, the interaction determiner 220 determines if an external device is connected to the example mobile device 115 using the processor on the mobile device. In such examples, the processor of the mobile device 115 is responsible for detecting changes in the circuit of an accessible connection point on the mobile device 115 (e.g., a headphone jack) as well as any Bluetooth connections made to the mobile device 115. In such examples, the interaction determiner 220 monitors the processor of the mobile device 115 for an execution of instructions for adding an external device connection (e.g., physical connection, Bluetooth connection, etc.). However, other techniques for determining if an external device is connected to the example mobile device 115 may additionally and/or alternatively be used. If the example interaction determiner 220 determines that an external device is connected to the example mobile device 115, the process 530 continues and the interaction determiner 220 determines the user attention is on the mobile device 115 (block 730). If the example interaction determiner 220 determines that no external devices are connected to the example mobile device 115, the process 530 continues and the interaction determiner determines if the orientation of the mobile device 115 changed (block 735).

The example interaction determiner 220 determines if the orientation of the example mobile device 115 changed (block 725). In some examples, the interaction determiner 220 determines if the angle of the orientation of the mobile device 115 has changed and/or is within a threshold of an angle (e.g., the angle of the device is approximately forty-five degrees, the angle of the device is between approximately thirty degrees and approximately sixty degrees, the angle has increased, the angle has decreased, and/or other changes of orientation of the mobile device 115). In some examples, the interaction determiner 220 determines if the orientation of the mobile device 115 changes using the sensor of the mobile device 115. In such examples, the mobile device 115 may include gyroscope sensors and/or rotation sensor that determine the orientation of the mobile device 115. In such examples, the interaction determiner 220 monitors the sensors of the mobile device 115 for any changes in the orientation data of the mobile device 115 (e.g., changes in angle measurements). However, other sensors and techniques for determining if the orientation of the mobile device 115 has changes may additionally and/or alternatively be used. If the example interaction determiner 220 determines that the orientation of the example mobile device 115 changed, the process 530 continues and the interaction determiner 220 determines the user attention is on the mobile device 115 (block 730). If the example interaction determiner 220 determines that the orientation of the example mobile device 115 did not change, the process 530 continues and the interaction determiner determines the user attention is not on the mobile device 115 (block 735).

Though the process 530 is described with the interaction determiner 220 sequentially performing the elements of blocks 710, 715, 720, and 725, there is no specific order required by the process 530. As noted above, the order of execution of the blocks may be rearranged. In addition, in some examples, the process 530 may perform one or more of the elements of blocks 710, 715, 720, and 725 simultaneously.

The example interaction determiner 220 determines that the user attention is on the example mobile device 115 (block 730). The example interaction determiner 220 determines that the user attention is on the example mobile device 115 based on when applications are launched on the example mobile device 115, user interactions are detected on the screen of the example mobile device 115, any external devices are connected to the example mobile device 115, and/or orientation of the mobile device changes or matches a threshold orientation. After block 730, the process 530 completes and returns to process 420 of FIG. 5.

The example interaction determiner 220 determines that the user attention is not on the example mobile device 115 (block 735). The example interaction determiner 220 determines that the user attention is not on the example mobile device 115 based on when no applications are launched on the example mobile device 115, no user interactions are detected on the screen of the example mobile device 115, no external devices are connected to the example mobile device 115, and/or an orientation of the mobile device does not change or match a threshold orientation. After block 735, the process 530 completes and returns to process 420 of FIG. 5.

Figure 8:
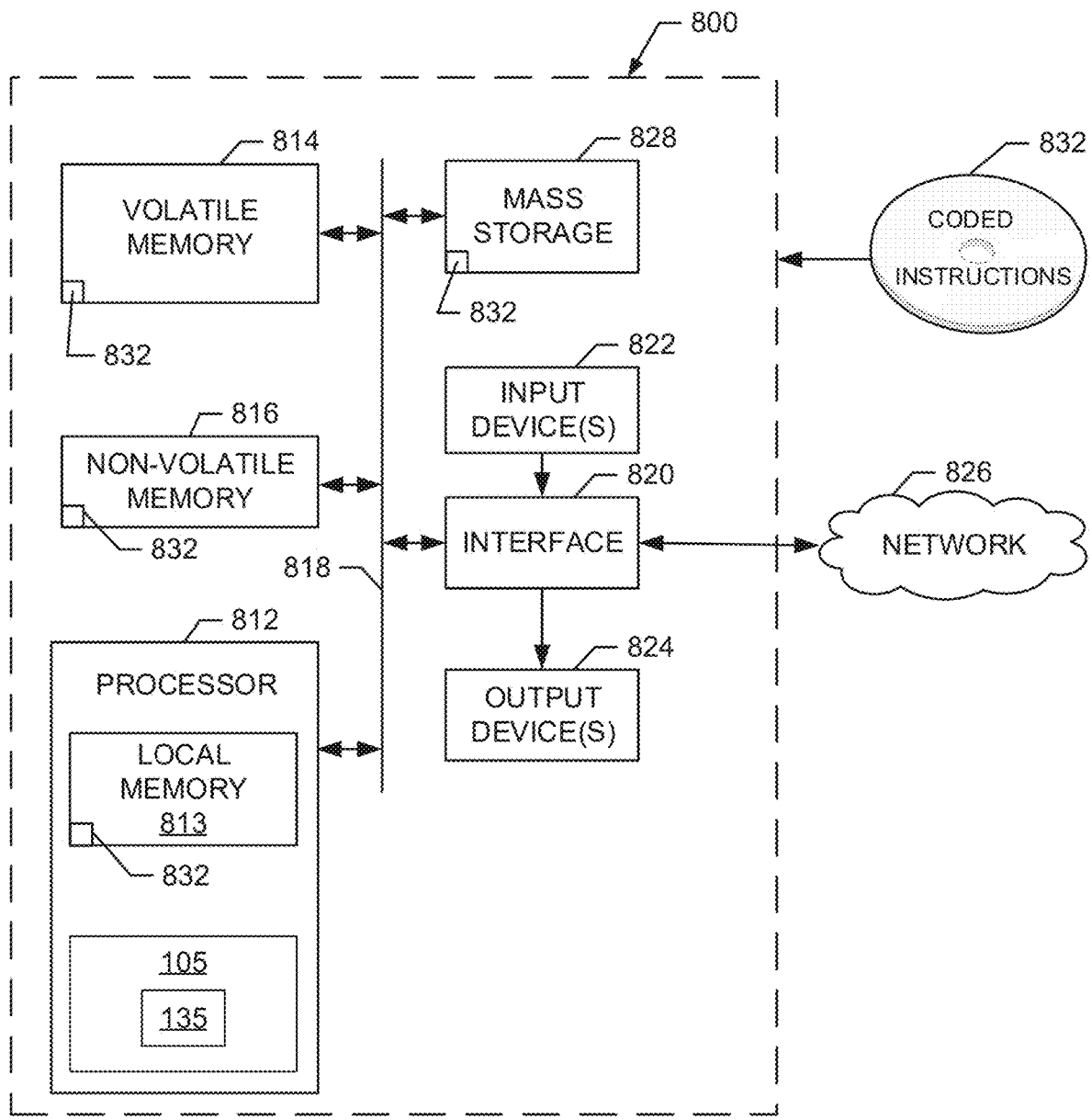
FIG. 8 is a block diagram of an example processing platform structured to execute the instructions of FIG. 3 to implement the example set device of FIG. 1.

FIG. 8 is a block diagram of an example processor platform 800 structured to execute the instructions of FIG. 3 to implement the example set device 105 of FIG. 1. The processor platform 800 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 800 of the illustrated example includes a processor 812. The processor 812 of the illustrated example is hardware. For example, the processor 812 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example set meter 135.

The processor 812 of the illustrated example includes a local memory 813 (e.g., a cache). The processor 812 of the illustrated example is in communication with a main memory including a volatile memory 814 and a non-volatile memory 816 via a bus 818. The volatile memory 814 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 816 may be implemented by flash memory and/or any other desired type of memory device. Access to the main memory 814, 816 is controlled by a memory controller.

The processor platform 800 of the illustrated example also includes an interface circuit 820. The interface circuit 820 may be implemented by any type of interface standard, such as an Ethernet interface, a universal serial bus (USB), a Bluetooth® interface, a near field communication (NFC) interface, and/or a PCI express interface.

In the illustrated example, one or more input devices 822 are connected to the interface circuit 820. The input device(s) 822 permit(s) a user to enter data and/or commands into the processor 812. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 824 are also connected to the interface circuit 820 of the illustrated example. The output devices 824 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 820 of the illustrated example, thus, typically includes a graphics driver card, a graphics driver chip and/or a graphics driver processor.

The interface circuit 820 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 826. The communication can be via, for example, an Ethernet connection, a digital subscriber line (DSL) connection, a telephone line connection, a coaxial cable system, a satellite system, a line-of-site wireless system, a cellular telephone system, etc.

The processor platform 800 of the illustrated example also includes one or more mass storage devices 828 for storing software and/or data. Examples of such mass storage devices 828 include floppy disk drives, hard drive disks, compact disk drives, Blu-ray disk drives, redundant array of independent disks (RAID) systems, and digital versatile disk (DVD) drives.

The machine executable instructions 832 of FIG. 3 may be stored in the mass storage device 828, in the volatile memory 814, in the non-volatile memory 816, and/or on a removable non-transitory computer readable storage medium such as a CD or DVD.

Figure 9:
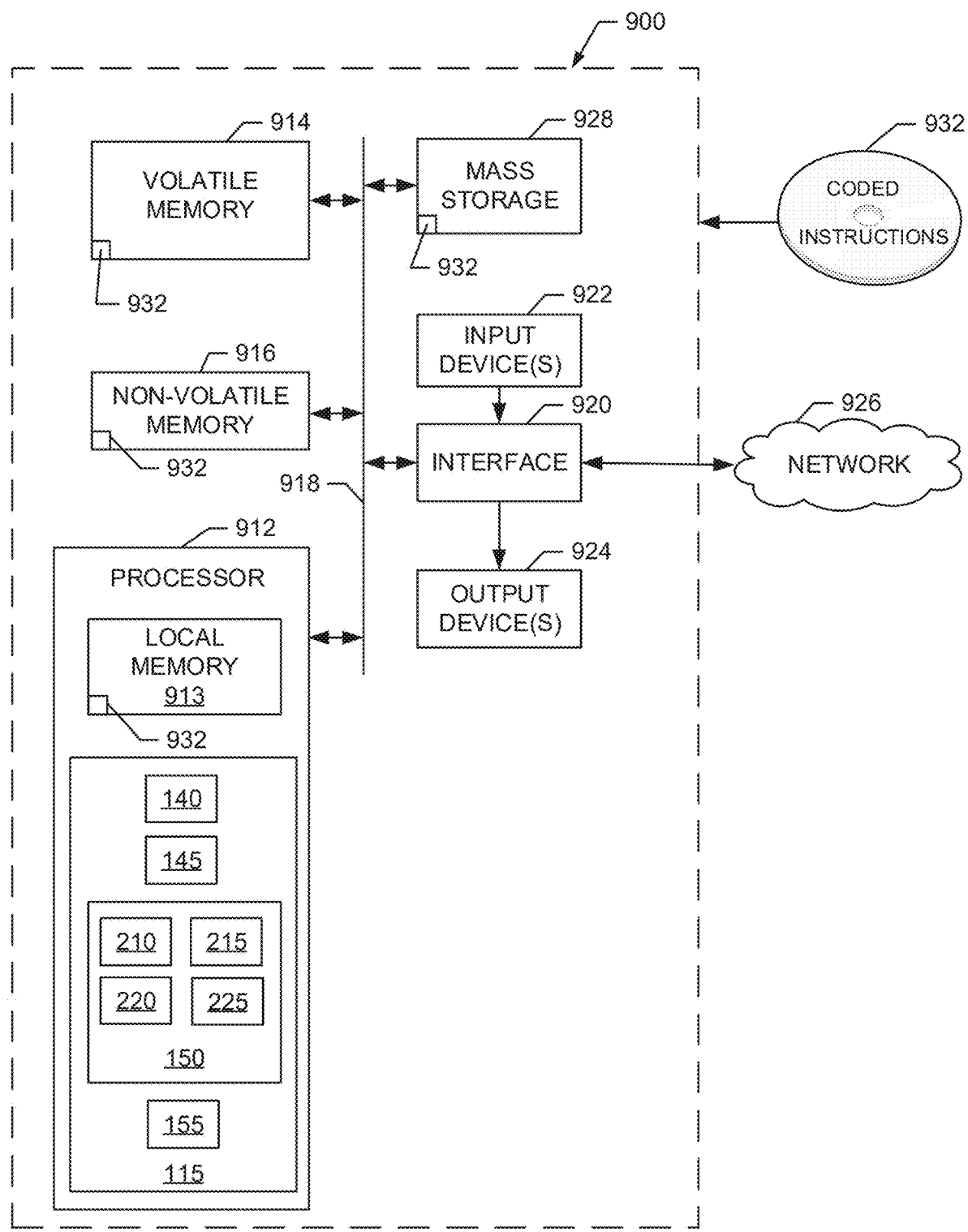
FIG. 9 is a block diagram of an example processing platform structured to execute the instructions of FIGS. 4, 5, 6, and 7 to implement the example mobile device of FIG. 1.

FIG. 9 is a block diagram of an example processor platform 900 structured to execute the instructions of FIGS. 4, 5, 6, and 7 to implement the example mobile device 115 of FIG. 1. The processor platform 900 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 900 of the illustrated example includes a processor 912. The processor 912 of the illustrated example is hardware. For example, the processor 912 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example mobile meter 140, the example interval timer 145, the example attention determiner 150, the example camera controller 210, the example camera data generator 215, the example interaction determiner, and the example attention data generator 225.

The processor 912 of the illustrated example includes a local memory 913 (e.g., a cache). The processor 912 of the illustrated example is in communication with a main memory including a volatile memory 914 and a non-volatile memory 916 via a bus 918. The volatile memory 914 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 916 may be implemented by flash memory and/or any other desired type of memory device. Access to the main memory 914, 916 is controlled by a memory controller.

The processor platform 900 of the illustrated example also includes an interface circuit 920. The interface circuit 920 may be implemented by any type of interface standard, such as an Ethernet interface, a universal serial bus (USB), a Bluetooth® interface, a near field communication (NFC) interface, and/or a PCI express interface.

In the illustrated example, one or more input devices 922 are connected to the interface circuit 920. The input device(s) 922 permit(s) a user to enter data and/or commands into the processor 912. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 924 are also connected to the interface circuit 920 of the illustrated example. The output devices 924 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 920 of the illustrated example, thus, typically includes a graphics driver card, a graphics driver chip and/or a graphics driver processor.

The interface circuit 920 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 926. The communication can be via, for example, an Ethernet connection, a digital subscriber line (DSL) connection, a telephone line connection, a coaxial cable system, a satellite system, a line-of-site wireless system, a cellular telephone system, etc.

The processor platform 900 of the illustrated example also includes one or more mass storage devices 928 for storing software and/or data. Examples of such mass storage devices 928 include floppy disk drives, hard drive disks, compact disk drives, Blu-ray disk drives, redundant array of independent disks (RAID) systems, and digital versatile disk (DVD) drives.

The machine executable instructions 932 of FIGS. 4, 5, 6, and 7 may be stored in the mass storage device 928, in the volatile memory 914, in the non-volatile memory 916, and/or on a removable non-transitory computer readable storage medium such as a CD or DVD.

From the foregoing, it will be appreciated that example methods, apparatus and articles of manufacture have been disclosed that allow for optimization of determining user attention to media. The disclosed methods, apparatus and articles of manufacture allow for more accurate crediting of media exposure by determining if a user is paying attention to media presented on a set device. The disclosed examples provide collective media exposure data to determine what media is more captivating for users. The disclosed methods, apparatus and articles of manufacture are accordingly directed to correcting erroneous audience measurement data that may be automatically gathered from a set-top box or other audience measurement meter. As disclosed herein, these examples detect a media event of interest (e.g., via watermarks, codes, signatures, etc.) and/or access data indicative of a scheduled media event of interest to trigger operation of a mobile device to gather user attention data. For example, one device (e.g., a set meter) triggers operation of cameras, sensors, and/or other data gathering devices in a second device (e.g., a mobile device) and causes the second device to report the gathered data indicative of user attention back to the first device and/or to a remote reporting facility. The user attention data is then reconciled with media presentation information gathered by the first device and/or AME to correct audience measurement data.

Example methods, apparatus, systems, and articles of manufacture for mobile device attention detection are disclosed herein. Further examples and combinations thereof include the following:

Example 1 includes an apparatus comprising a mobile meter to receive, from an external device, a signal to gather user attention data, and transmit the user attention data, an interval timer to activate a time period for determining attention of a user, and an attention determiner to generate the user attention data during the time period.

Example 2 includes the apparatus of example 1, wherein the attention determiner is to activate a camera on a mobile device and determine if a face is detected by the camera during the time period and based on an orientation of the face.

Example 3 includes the apparatus of example 2, wherein the attention determiner is to generate the user attention data indicative of attention of the user being on the mobile device based on the face being detected by the camera and the orientation of the face being toward the mobile device during the time period.

Example 4 includes the apparatus of example 2, wherein the attention determiner is to generate the user data indicative of attention of the user being away from the mobile device based on one or more of (1) the face not being detected by the camera during the time period, or (2) the face being detected by the camera and the orientation of the face being away from the mobile device during the time period.

Example 5 includes the apparatus of example 1, wherein the attention determiner is to determine user interaction with a mobile device during the time period, and generate the user attention data based on the user interaction with the mobile device.

Example 6 includes the apparatus of example 5, wherein the attention determiner is to determine user interaction with the mobile device based on an application launch on the mobile device.

Example 7 includes the apparatus of example 5, wherein the attention determiner is to determine user interaction with the mobile device based on user touch on a screen of the mobile device.

Example 8 includes the apparatus of example 5, wherein the attention determiner is to determine user interaction with the mobile device based on an external device connection to the mobile device.

Example 9 includes the apparatus of example 1, wherein the mobile meter is to receive the signal when a presentation of an advertisement is detected on a media device within proximity of the mobile meter.

Example 10 includes the apparatus of example 9, wherein the signal is based on at least one of a watermark or a signature of the advertisement.

Example 11 includes a method comprising receiving, from an external device, a signal to gather user attention data, activating, by executing instructions with a processor, a time period for determining attention of a user, generating, by executing instructions with the processor, the user attention data during the time period, and transmitting the user attention data.

Example 12 includes the method of example 11, further including activating, by executing instructions with the processor, a camera on a mobile device, and determining, by executing instructions with the processor, if a face is detected by the camera during the time period and based on an orientation of the face.

Example 13 includes the method of example 12, wherein the generating the user attention data during the time period includes generating user attention data indicative of the attention of the user being on the mobile device based on the face being detected by the camera and the orientation of the face being toward the mobile device during the time period.

Example 14 includes the method of example 12, wherein the generating the user attention data during the time period includes generating user attention data indicative of the attention of the user being away from the mobile device based on one or more of (1) the face not being detected by the camera during the time period, or (2) the face being detected by the camera and the orientation of the face being away from the mobile device during the time period.

Example 15 includes the method of example 11, wherein the generating the user attention data during the time period includes determining user interaction with a mobile device during the time period, and generating the user attention data based on the user interaction with the mobile device.

Example 16 includes the method of example 15, wherein the generating the user attention during the time period includes determining user interaction with the mobile device based on an application launch on the mobile device.

Example 17 includes the method of example 15, wherein the generating the user attention during the time period includes determining user interaction with the mobile device based on user touch on a screen of the mobile device.

Example 18 includes the method of example 15, wherein the generating the user attention during the time period includes determining user interaction with the mobile device based on an external device connection to the mobile device.

Example 19 includes the method of example 11, wherein receiving, from the external device, the signal to gather user attention data is to occur when a presentation of an advertisement is detected on a media device within proximity of a mobile meter.

Example 20 includes the method of example 19, wherein the signal is based on at least one of a watermark or a signature of the advertisement.

Example 21 includes At least one non-transitory computer readable medium comprising instructions that, when executed, cause at least one processor to at least receive, from an external device, a signal to gather user attention data, activate a time period for determining attention of a user, generate the user attention data during the time period, and transmit the user attention data.

Example 22 includes the at least one non-transitory computer readable medium of example 21, wherein the instructions, when executed, cause the at least one processor to activate a camera on a mobile device and determine if a face is detected by the camera during the time period and based on an orientation of the face.

Example 23 includes the at least one non-transitory computer readable medium of example 22, wherein the instructions, when executed, cause the at least one processor to generate the user attention data as user attention data indicative of attention of the user being on the mobile device based on the face being detected by the camera and the orientation of the face being toward the mobile device during the time period.

Example 24 includes the at least one non-transitory computer readable medium of example 22, wherein the instructions, when executed, cause the at least one processor to generate the user data as user attention data indicative of attention of the user being away from the mobile device based on one or more of (1) the face not being detected by the camera during the time period, or (2) the face being detected by the camera and the orientation of the face being away from the mobile device during the time period.

Example 25 includes the at least one non-transitory computer readable medium of example 21, wherein the instructions, when executed, cause the at least one processor to determine user interaction with a mobile device during the time period, and generate the user attention based on the user interaction with the mobile device.

Example 26 includes the at least one non-transitory computer readable medium of example 25, wherein the instructions, when executed, cause the at least one processor to determine user interaction with the mobile device based on an application launch on the mobile device.

Example 27 includes the at least one non-transitory computer readable medium of example 25, wherein the instructions, when executed, cause the at least one processor to determine user interaction with the mobile device based on user touch on a screen of the mobile device.

Example 28 includes the at least one non-transitory computer readable medium of example 25, wherein the instructions, when executed, cause the at least one processor to determine user interaction with the mobile device based on an external device connection to the mobile device.

Example 29 includes the at least one non-transitory computer readable medium of example 21, wherein receiving, from the external device, the signal to gather user attention data is to occur when a presentation of an advertisement is detected on a media device within proximity of a mobile meter.

Example 30 includes the at least one non-transitory computer readable medium of example 29, wherein the signal is based on at least one of a watermark or a signature of the advertisement.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:

1. A method comprising:
collecting, using a set meter, media information;
identifying using the media information a start of a media event of interest; and
transmitting, based on an identification of the start of the media event of interest, a control start signal from the set meter to a mobile meter on a mobile device, wherein reception of the control start signal by the mobile meter causes the mobile meter to initiate gathering of user attention data.

2. The method of claim 1, wherein transmitting the control start signal from the set meter to the mobile meter comprises transmitting over at least one of a Wi-Fi, a Bluetooth, or a cellular interface.

3. The method of claim 1, wherein the mobile device is a smartphone.

4. The method of claim 1, wherein identifying using the media information the start of the media event of interest comprises using at least one of watermarking, signature matching, or automatic content recognition (ACR).

5. The method of claim 1, wherein collecting, using the set meter, media information comprises obtaining a watermark; and wherein identifying using the media information the start of the media event of interest comprises decoding the watermark to identify the media event of interest and the start of the media event of interest.

6. The method of claim 1, further comprising:
identifying an end of the media event of interest;
receiving user attention data for a period of time after transmitting the control start signal, wherein the user attention data is indicative of whether a user is viewing the mobile device; and
transmitting, based on an identification of the end of the media event of interest, a control end signal from the set meter to the mobile meter to stop gathering attention information.

7. The method of claim 6, wherein at least a portion of the user attention data is received prior to identifying the end of the media event of interest, and wherein the user attention data is received by the set meter from the mobile meter.

8. A computing system comprising:
a processor; and
a non-transitory computer-readable storage medium, having stored thereon program instructions that, upon execution by the processor, cause performance of a set of operations comprising:
collecting, using a set meter, media information;
identifying using the media information a start of a media event of interest; and
transmitting, based on an identification of the start of the media event of interest, a control start signal from the set meter to a mobile meter on a mobile device, wherein reception of the control start signal by the mobile meter causes the mobile meter to initiate gathering of user attention data.

9. The computing system of claim 8, wherein transmitting the control start signal from the set meter to the mobile meter comprises transmitting over at least one of a Wi-Fi, a Bluetooth, or a cellular interface.

10. The computing system of claim 8, wherein the mobile device is a smartphone.

11. The computing system of claim 8, wherein collecting, using the set meter, media information comprises obtaining a watermark; and wherein identifying using the media information the start of the media event of interest comprises decoding the watermark to identify the media event of interest and the start of the media event of interest.

12. The computing system of claim 8, wherein identifying using the media information the start of the media event of interest comprises using at least one of watermarking, signature matching, or automatic content recognition (ACR).

13. The computing system of claim 8, the set of operations further comprising:
identifying an end of the media event of interest;
receiving user attention data for a period of time after transmitting the control start signal; and
transmitting, based on an identification of the end of the media event of interest, a control end signal from the set meter to the mobile meter to stop gathering attention information.

14. The computing system of claim 13, wherein at least a portion of the user attention data is received prior to identifying the end of the media event of interest, and wherein the user attention data is received by the set meter from the mobile meter.

15. A non-transitory computer-readable storage medium, having stored thereon program instructions that, upon execution by a processor,
cause performance of a set of operations comprising:
collecting, using a set meter, media information;
identifying using the media information a start of a media event of interest; and
transmitting, based on an identification of the start of the media event of interest, a control start signal from the set meter to a mobile meter on a mobile device, wherein reception of the control start signal by the mobile meter causes the mobile meter to initiate gathering of user attention data.

16. The non-transitory computer-readable storage medium of claim 15, wherein transmitting the control start signal from the set meter to the mobile meter comprises transmitting over at least one of a Wi-Fi, a Bluetooth, or a cellular interface.

17. The non-transitory computer-readable storage medium of claim 15, wherein identifying using the media information the start of the media event of interest comprises using at least one of watermarking, signature matching, or automatic content recognition (ACR).

18. The non-transitory computer-readable storage medium of claim 15, the set of operations further comprising:
identifying an end of the media event of interest; and
transmitting, based on an identification of the end of the media event of interest, a control end signal from the set meter to the mobile meter to stop gathering attention information.

19. The non-transitory computer-readable storage medium of claim 18, the set of operations further comprising:
receiving user attention data for a period of time after transmitting the control start signal.

20. The non-transitory computer-readable storage medium of claim 19, wherein at least a portion of the user attention data is received prior to identifying the end of the media event of interest, and wherein the user attention data is received by the set meter from the mobile meter.

* * * * *